(12) United States Patent
Wong et al.

(10) Patent No.: US 6,636,203 B1
(45) Date of Patent: Oct. 21, 2003

(54) KEYBOARD EQUIVALENT PAD OVERLAY ENCASEMENT FOR A HANDHELD ELECTRONIC DEVICE

(75) Inventors: Yoon Kean Wong, Menlo Park, CA (US); Cheri Nola Leonard, San Jose, CA (US); Kenneth James Albanowski, San Jose, CA (US)

(73) Assignee: Palm, Inc., Santa Clara, CA (US)

( * ) Notice: Subject to any disclaimer, the term of this patent is extended or adjusted under 35 U.S.C. 154(b) by 66 days.

(21) Appl. No.: 09/861,040

(22) Filed: May 17, 2001

(51) Int. Cl.[7] .................... G09G 5/00; G06K 11/06; G08C 21/00
(52) U.S. Cl. ..................... 345/173; 178/18.01
(58) Field of Search ................. 345/169, 172, 345/173; 341/22, 23, 34; 178/18.01

(56) References Cited

U.S. PATENT DOCUMENTS

| 4,855,725 | A | * | 8/1989 | Fernandez | 345/173 |
|---|---|---|---|---|---|
| 4,958,148 | A | * | 9/1990 | Olson | 345/174 |
| 5,250,929 | A | * | 10/1993 | Hoffman et al. | 345/823 |
| 5,485,176 | A | * | 1/1996 | Ohara et al. | 345/173 |
| 5,572,573 | A | * | 11/1996 | Sylvan et al. | 455/556 |
| 5,646,649 | A | * | 7/1997 | Iwata et al. | 345/173 |
| 5,739,814 | A | * | 4/1998 | Ohara et al. | 345/173 |
| 5,810,604 | A | * | 9/1998 | Kopp et al. | 434/317 |
| 5,847,698 | A | * | 12/1998 | Reavey et al. | 345/173 |
| 6,072,475 | A | * | 6/2000 | van Ketwich | 345/173 |
| 6,262,646 | B1 | * | 7/2001 | Van Zeeland | 335/205 |
| 6,327,459 | B2 | * | 12/2001 | Redford et al. | 434/307 R |

* cited by examiner

Primary Examiner—Richard Hjerpe
Assistant Examiner—M. Fatahiryar
(74) Attorney, Agent, or Firm—Wagner, Murabito & Hao LLP

(57) ABSTRACT

Embodiments of the present invention relate to methods of enabling a portable electronic device with a transparent, flexible, removable, pushbutton overlay that lays over at least a portion of the graphic touch-screen display on the portable electronic device. The pushbuttons in the overlay are designed to transmit finger pressure to the pressure-sensitive touch-screen display and also to provide a natural feeling tactile feedback to the user. At the same time, being transparent, the overlay allows the user to view the contents of the Graphical User Interface that are presented directly beneath the buttons and allow the user to respond to those contents. The buttons are, in some embodiments, enabled as magnifying lenses in order to better present the GUI contents.

21 Claims, 11 Drawing Sheets

KEYBOARD EQUIVALENT PAD OVERLAY ENCASEMENT FOR A HANDHELD ELECTRONIC DEVICE

FIELD OF THE INVENTION

The present invention relates to the field of user input in handheld portable electronic devices.

BACKGROUND OF THE INVENTION

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

Further development of PDAs has enabled their use for more and more tasks. For example, portable, and even wireless, access to computer networks is now readily available with suitably configured devices. The portability and convenience of palmtop devices has enabled the even more exciting possibilities encompassed by the combination of the capabilities of palmtop devices with the communication convenience of wireless phones, e.g. cellular phones.

As the capabilities of the two device types merge, and even combine into the same unit, new demands are made of the small display area available on these characteristically small devices. The display/touch-screen area of these portable devices is necessarily limited by the size of the devices themselves, which is their primary advantage. In particular, the use of a palmtop computing device that is also a cellular phone has been limited by the requirement of having a telephone keypad implemented on the body of the device, further squeezing the already small available display area.

One possible solution seen in pen-based phones, those implemented with the functions and operating system of a PDA, is the incorporation of the telephone dialing display into the operating system graphical user interface (GUI). This implementation necessitates that the user look at the touch-screen in order to properly dial a number. Similarly, palmtop devices implemented as wireless telephones either must incorporate a hard keypad into the palmtop body, enlarging the device; implement the keypad in the dialing display, which invokes the aforementioned limitation of requiring the user to look at the display while dialing; or supply a separate keypad device and connecting cable, entailing use of what becomes a much less portable and handy device.

What is required, therefore, is a mechanism by which the palmtop device and/or wireless telephone can eliminate the large pushbutton keypad. Such a mechanism must allow for a relatively larger display area, on the order of those now enjoyed in palmtop devices, and still allow full functionality of a keypad.

SUMMARY OF THE INVENTION

Presented herein is a mechanism for providing a tactile keypad that incorporates the functions of a pushbutton keypad into the touch-screen display of a portable electronic device. The tactile pushbutton keypad may be removable. The mechanism presented herein allows for a relatively larger display area on small devices while still allowing full functionality of both the touch-screen display and the pushbutton keypad.

Embodiments of the present invention relate to methods of enabling a portable electronic device with a transparent, flexible, removable, pushbutton overlay that lays over at least a portion of the graphic touch-screen display on the portable electronic device. The pushbuttons in the overlay are designed to transmit finger pressure to the pressure-sensitive touch-screen display and also to provide a natural feeling tactile feedback to the user. At the same time, being transparent, the overlay allows the user to view the contents of the Graphical User Interface that are presented directly beneath the buttons and allow the user to respond to those contents. The buttons are, in some embodiments, enabled as magnifying lenses in order to better present the GUI contents.

More specifically, embodiments of the present invention include a portable electronic device; comprising a computing circuit, power supply, housing, graphic touch-screen display, and a transparent, flexible, overlay that covers at least a portion of the graphic touch-screen display; and the graphic touch-screen display is capable of receiving finger pressure through the transparent, flexible, overlay.

BRIEF DESCRIPTION OF THE DRAWINGS

The operation and components of this invention can be best visualized by reference to the drawings.

SPECIFICATION

Figure 1:
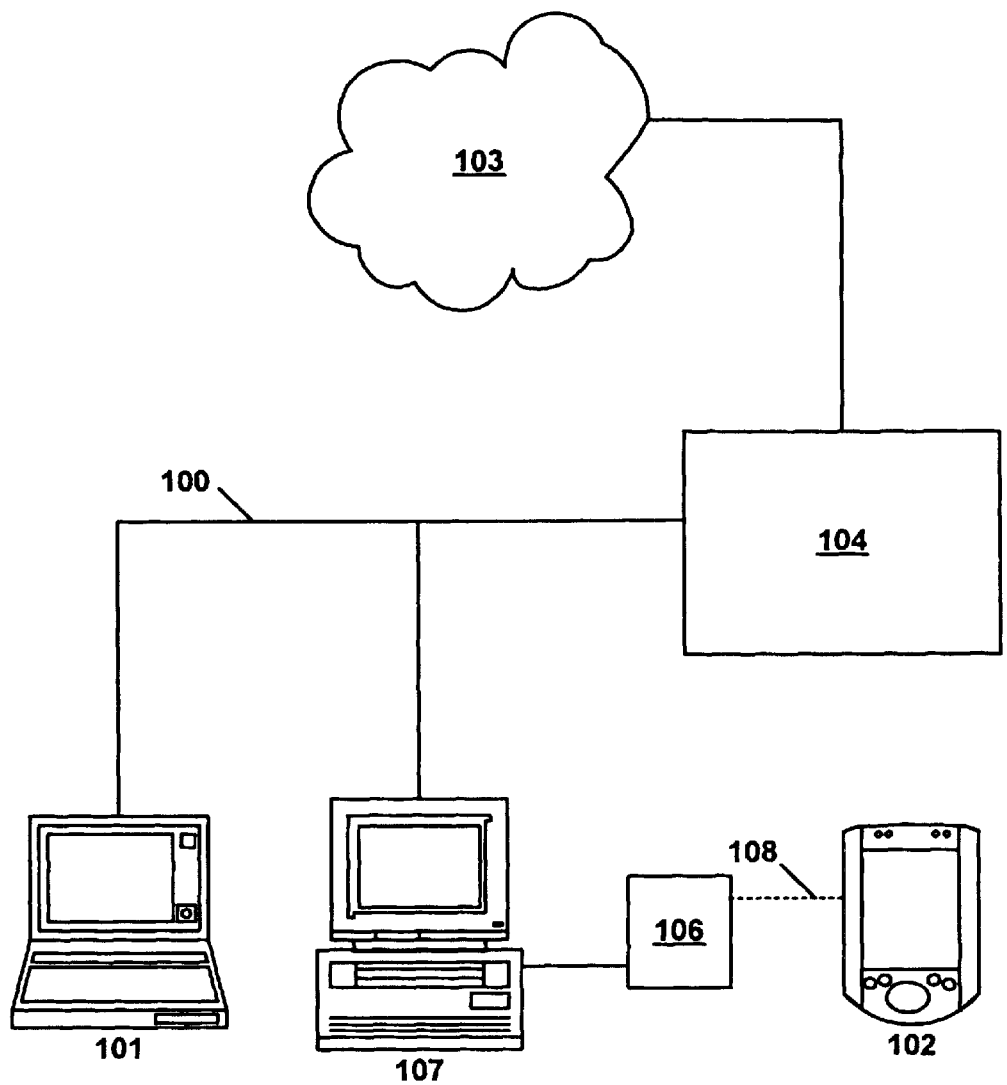
FIG. 1 illustrates a computer network consistent with embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

DETAILED DESCRIPTION

The embodiments of the present invention discussed herein relate to an overlay device that utilizes a portion of the touch-screen display in a portable electronic device which may also be enabled as a wireless telephone. The portable electronic device could be a PDA having wireless telephone functionality or it could be a wireless telephone having PDA functionality. The basic difference between these is related to form factor selected, display size and physical user interface. Also contemplated are pagers and other portable remote control devices.

The portion of the touch-screen display referred to could be all or part of the display enabled with a graphic user interface (GUI) which would provide cues for information required to be entered and areas of the screen in which the GUI expected input. Specifically, in this embodiment of the present invention, the screen would display numbers and the overlay would allow a user to tactilely feel a pushbutton action while applying pressure to the displayed numbers. Other embodiments could provide input-required cues and input areas associated with other applications. Such other implementations could include document scanners, navigation and mapping programs or any of a huge number of applications that require user input to a GUI.

In this discussion of some embodiments of the present invention, the terms "palmtop", "palm device", "PDA", "handheld device", "electronic book", "E-book", "portable electronic device" and "portable computing device" are used more or less interchangeably, as noted above. In each case, they refer to a class of small, user-portable, computing devices that are capable of performing the functions of portable computing devices and, importantly, accept user input in the form of pressure applied to a touch-screen display/input device. Some of the above terms are also used to refer to devices that combine the functions of portable computing devices with those of wireless telephones.

In this discussion, the terms "wireless telephone", "wireless telephone device", "cellular telephone", "wireless phone" and "portable telephone device" are also used more or less interchangeably. In each case, they refer to a class of small, user-portable, communication devices that are capable of voice and/or data communication with other cellular telephones, hardwired telephones or networks by wireless links. In some implementations of wireless telephones in which a GUI has been implemented, user input can be entered by the use of a stylus or other pen-like pointing device. These devices can be referred to as a "pen-based" telephones.

The operation of this embodiment of the present invention and the environment in which its operates can be understood by reference to the figures. FIG. 1 presents, in logical form, a typical network in accordance with one embodiment of the present invention as implemented on a PDA. Both desktop computer 107 and laptop 101 and connected to network 100 which also served by server 104. Server 104 also, in this implementation, provides connectivity to internet 103. Connected to desktop 107 is palmtop device cradle 106 which provides a means of connecting, 108, palmtop device 102. By supplying this connection, desktop 107 takes on the role of host device to palmtop device 102. Although the connectivity of palmtop device 102 is shown in this embodiment to be by hardwired cradle (see FIG. 4), other embodiments may employ infrared, RF or any other means of connectivity between the host device and the portable device. By whatever means connected, the object of synchronization is to share data between copies of a database between a PDA and a host computer. An important part of this synchronization, applicable to this embodiment of the present invention, is the ability to quickly and conveniently load applications and data, such as telephone number databases, onto a portable telephone device that is synchronization enabled.

Figure 2:
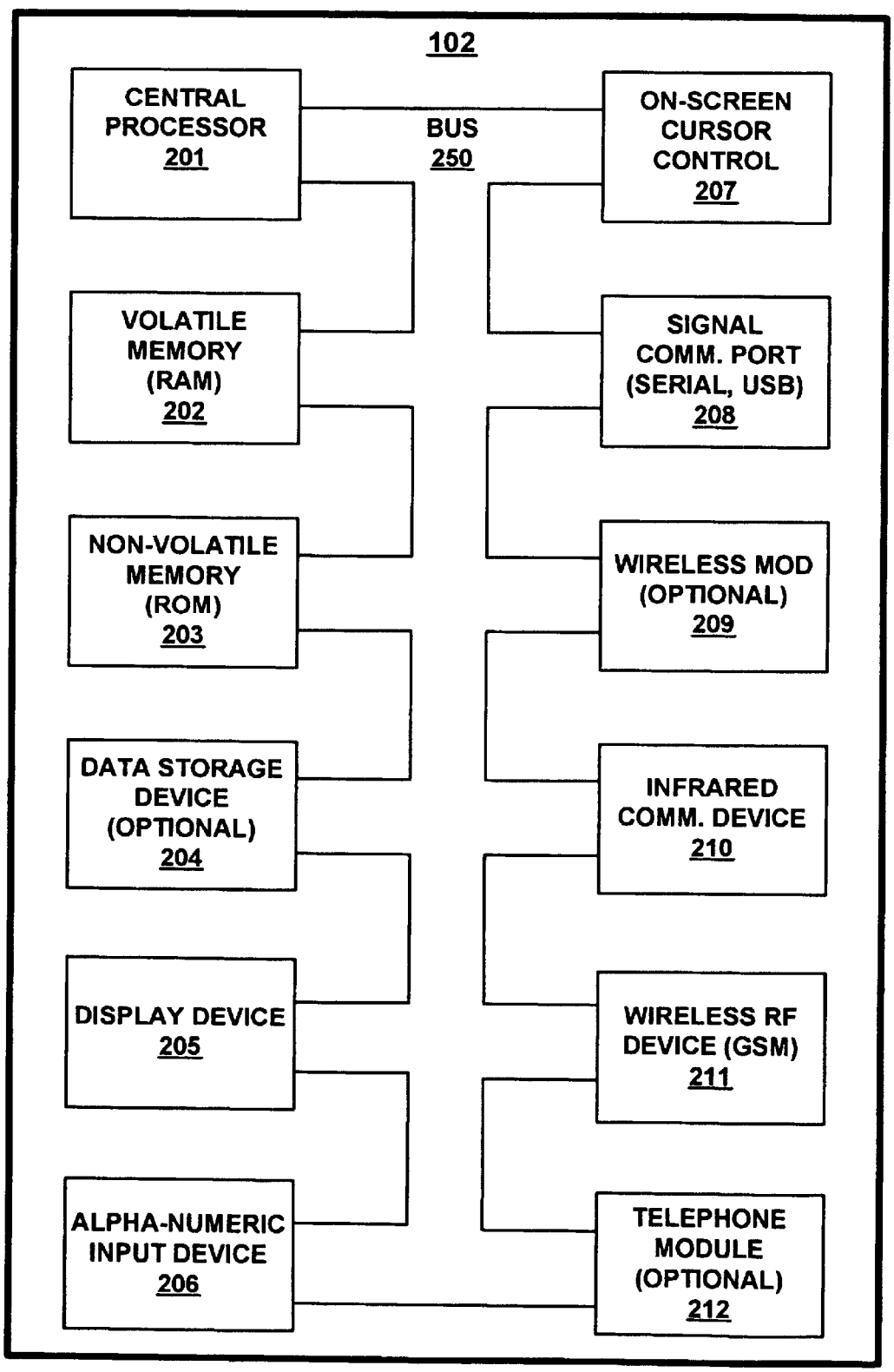
FIG. 2 a block diagram illustrating an embodiment of a portable computer system in accordance with the present invention.
Figure 3:
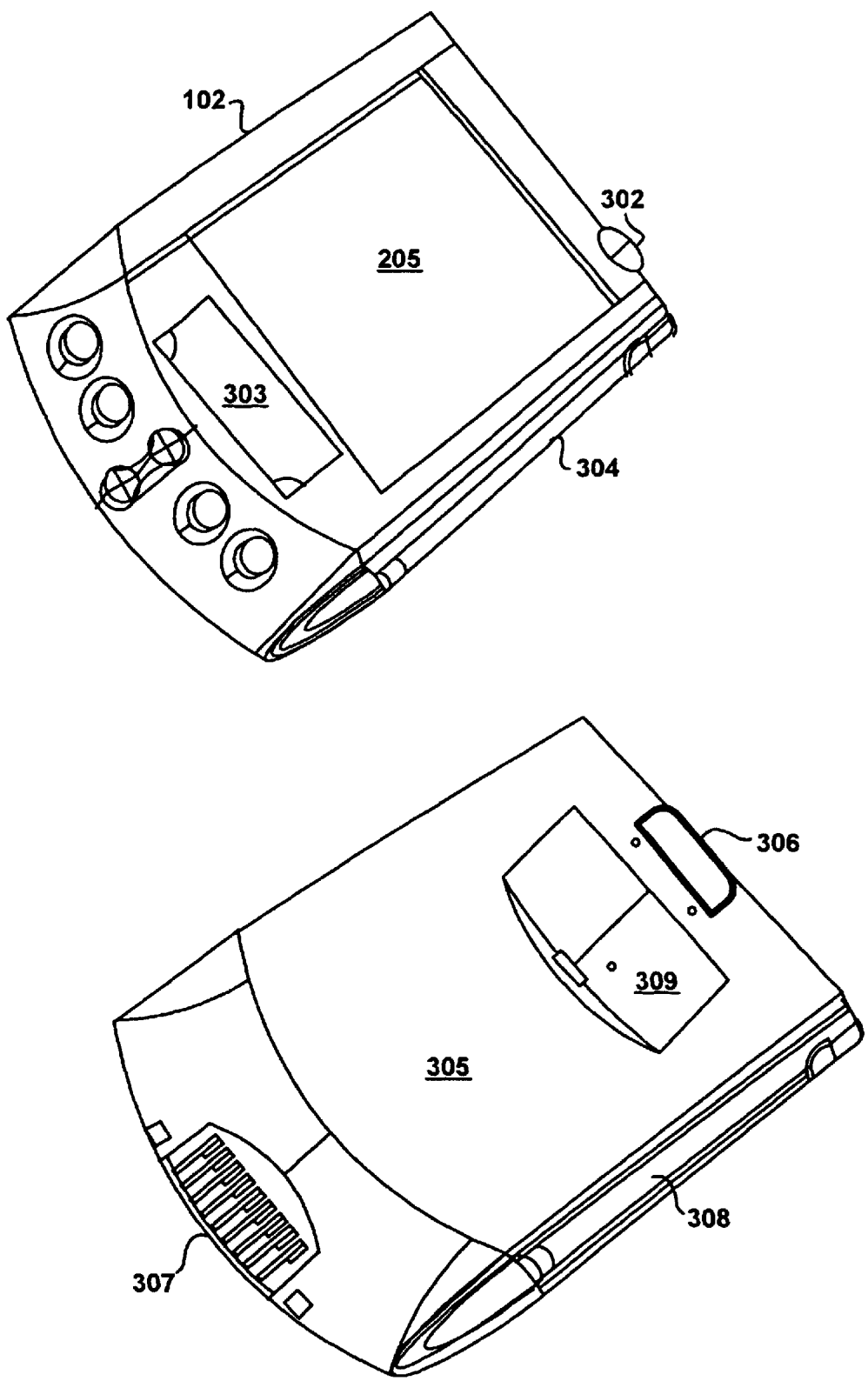
FIG. 3 illustrates a physical embodiment of a portable computer system in accordance with one embodiment of the present invention.

As noted above, embodiments of the present invention may be practiced on a wireless phone, a pager, a PDA, or the like. A typical palmtop device is illustrated in FIGS. 2 and 3. FIG. 2 illustrates, in block diagram, a configuration typical to a palmtop device or PDA or intelligent wireless phone. Computer system 102 comprises bus 250 which connects processor 201, volatile RAM 202, non-volatile ROM 203 and data storage device 204. Also connected to the bus are display device 205, alpha-numeric input device 206, cursor control 207, and signal I/O device 208. Signal I/O device 208 is implemented as a serial connection, an infrared transceiver 210 or an RF transceiver 211 and any one of them can, in some embodiments, be used as the link for synchronization. In wireless telephones or in PDA's configured to include the functions of wireless telephones, telephone communications module 212 would also be included. The configuration of the devices to which this embodiment of the present invention applies may vary, depending on the specific tasks undertaken. In every case, however, display device 205 and cursor control 207 would be implemented in one form or other.

Another type of device to which FIG. 2 provides insight is the "electronic book" or "E-book". E-books are small, portable, electronic devices that are particularly well adapted to present documents in a readable format. Some E-books are even implemented in a form factor similar to a printed book. In most E-book implementations, the functionality of a portable handheld computer is available in the appropriate application.

FIG. 3, a top and bottom view of an exemplary palmtop device, illustrates the physical implementation of some of the logical devices above. Panel 205, in top view of device 102, integrates the display device and, when touched with stylus 304, cursor control. Alpha-numeric input is via input panel 303. Power to the device is applied when on/off button 302 is depressed. Connection to a network can be implemented either through an RF connection using extendible antenna 308, or by infrared (IR) connection. IR connection is provided by IR window 306 which is shown on bottom view 305. Connector array 307 provides the capability for wired connectivity to a desktop computer and thence a network by the use of a cradle (See FIG. 4). Although implemented in this embodiment as a serial port, wired connectivity via connector 307 could also alternatively be any of a number of well known communication standards and protocols, e.g., parallel, SCSI (small computer system interface), Firewire (IEEE 1394), Ethernet, etc.

Figure 4:
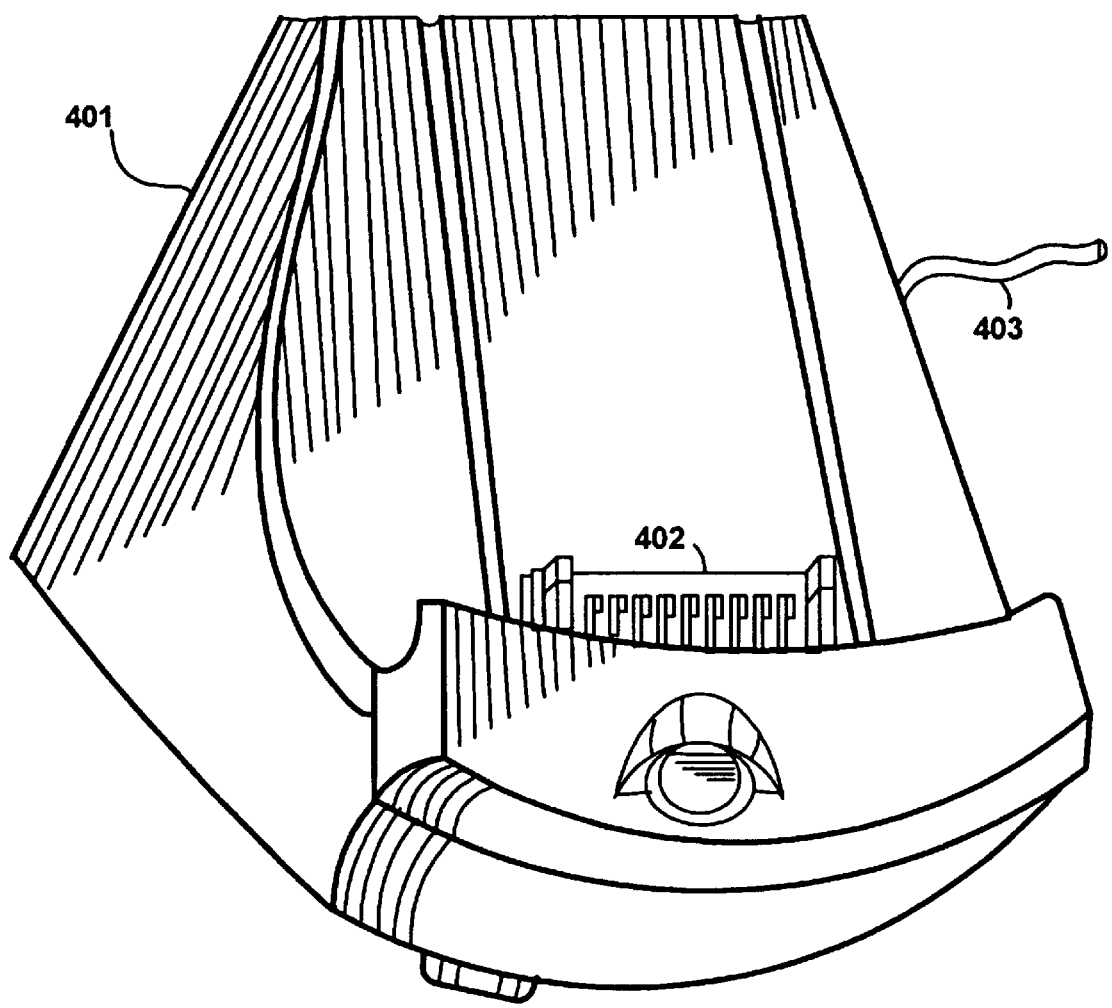
FIG. 4 illustrates a cradle for a hard-wired connection of a typical portable computing device in accordance with one embodiment of the present invention.

The typical connection between a portable computing device and its associated host device is by a cradle connected to a serial port on the host device. FIG. 4 is an illustration of a typical cradle. To connect, the palmtop device is set in cradle 401 where connector array 402 contacts the counterpart connectors on the portable device. The connectors, through cable 403, enable serial communication with the host device. The host device is represented in this embodiment as desktop 107 in FIG. 1.

Figures 5A, 5B:
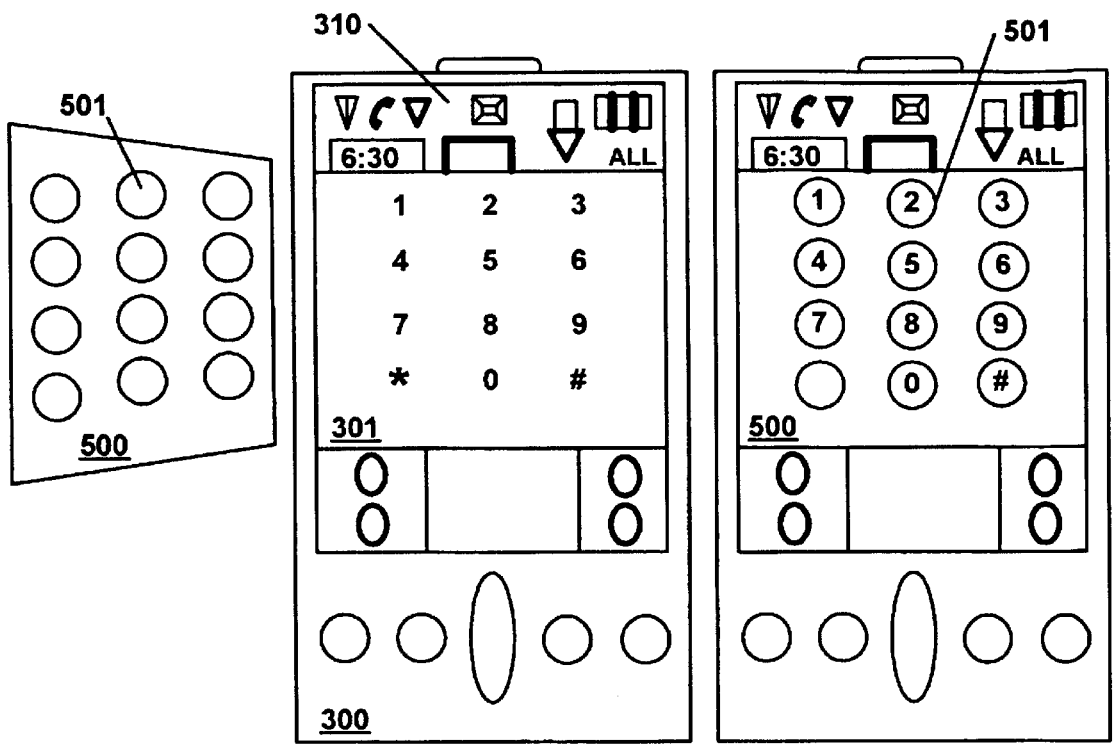
FIG. 5A illustrates one possible implementation of one embodiment of the present invention.
FIG. 5B illustrates one possible implementation of one embodiment of the present invention.

FIGS. 5A and 5B illustrate an implementation of one embodiment of the present invention. Here, a handheld computing device 300 is enabled as a wireless telephone as indicated by the dialable numbers displayed in an on-screen keypad, 301, located in touch-screen display 205 and the telephone status icons arrayed in display area 310. Without the application of the embodiment of the present invention implemented here, the user would dial a phone number by touching the correct numbers in on-screen interface shown in display 205 with the pen stylus supplied with the handheld device, at best a two handed operation requiring direct viewing by the user. With the embodiment of the present invention implemented here as transparent display overlay 500, the user can press tactile feedback buttons 500 much as he or she would in normal wireless phone operation. In this particular illustration, flexible transparent overlay 500 is shown as being hinged at one side of the touch-screen display; FIG. 5A showing the hinged transparent flexible overlay in the up position and FIG. 5B showing overlay 500 in the position of use on touch-screen display 205. This is only for purposes of illustration; any number of implementations could be employed to produce the same effect of overlaying the touch-screen display with a transparent, flexible, overlay.

Also shown in the differences between FIGS. 5A and 5B are the apparent sizes of the numbers displayed in the GUI. This illustrates another embodiment wherein the tactile feedback buttons 501, being transparent, are shaped so as to be implemented as low power magnifying lenses which can magnify the information presented beneath each button.

Figure 6:
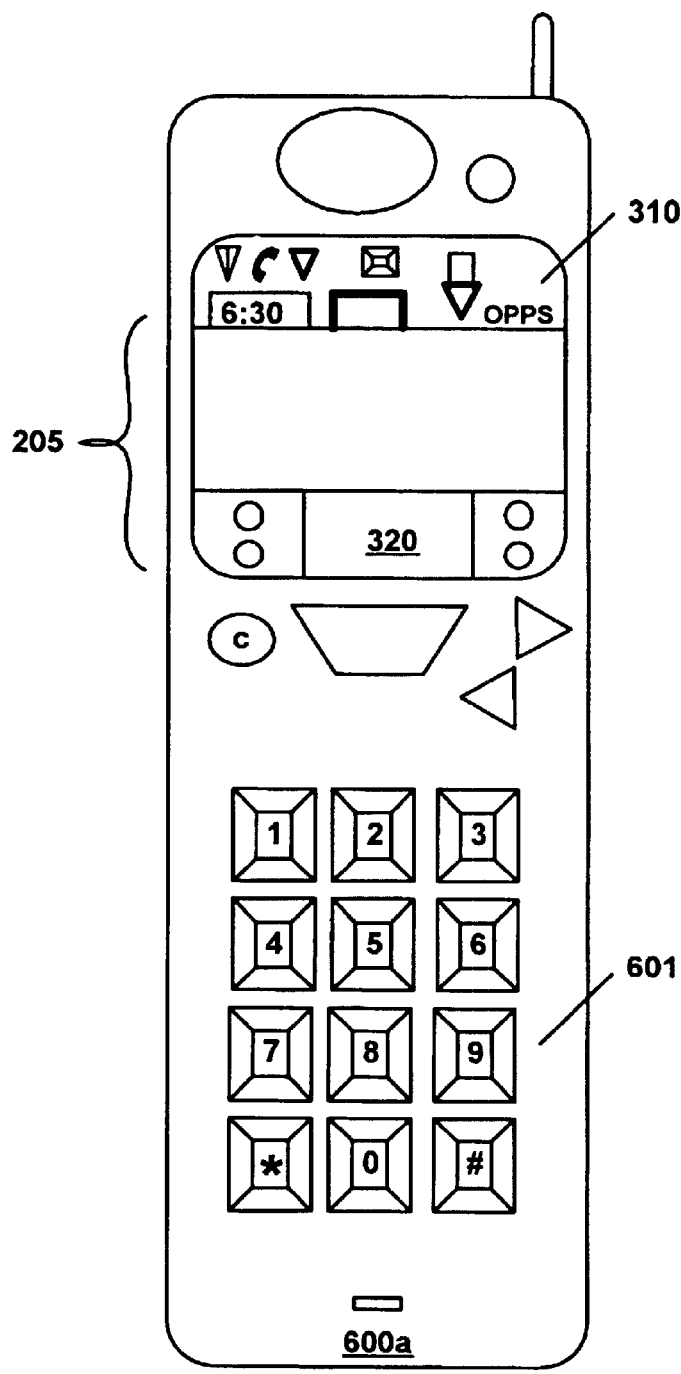
FIG. 6 illustrates a portable, wireless, telephone enabled as a PDA in accordance with an embodiment of the present invention.

FIG. 6 illustrates a wireless cellular phone, 600a, which is implemented with a popular PDA operating system as indicated in iconic array 310, encompassing functions of a cellular phone, at the top of display 205 and in alphanumeric input area 320 at the bottom of display 205. This implementation also entails the enabling of display 205 as a touch-screen. A significant feature of cellular phones is the necessary physical keypad 601. By requiring keypad 601 be incorporated into the phone body, the size of the phone and especially the area of the display are necessarily limited.

Figure 7A:
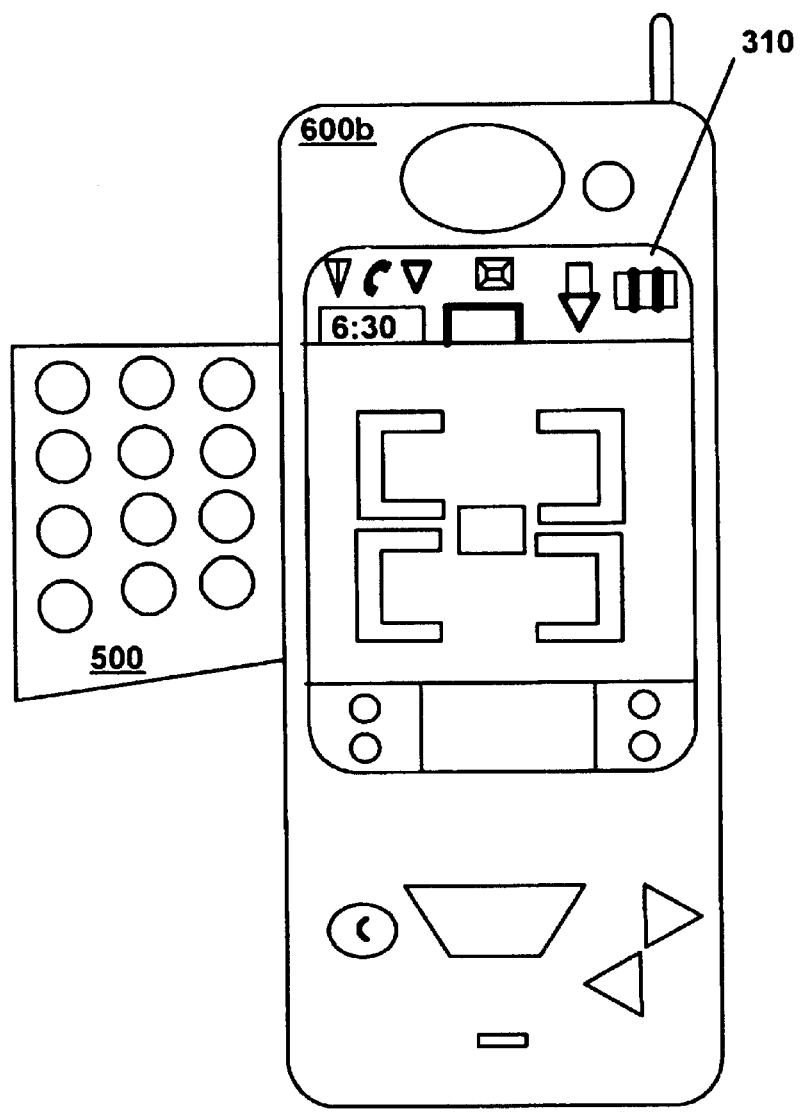
FIG. 7A illustrates a portable, wireless, telephone enabled as a PDA in accordance with an embodiment of the present invention.
Figure 7B:
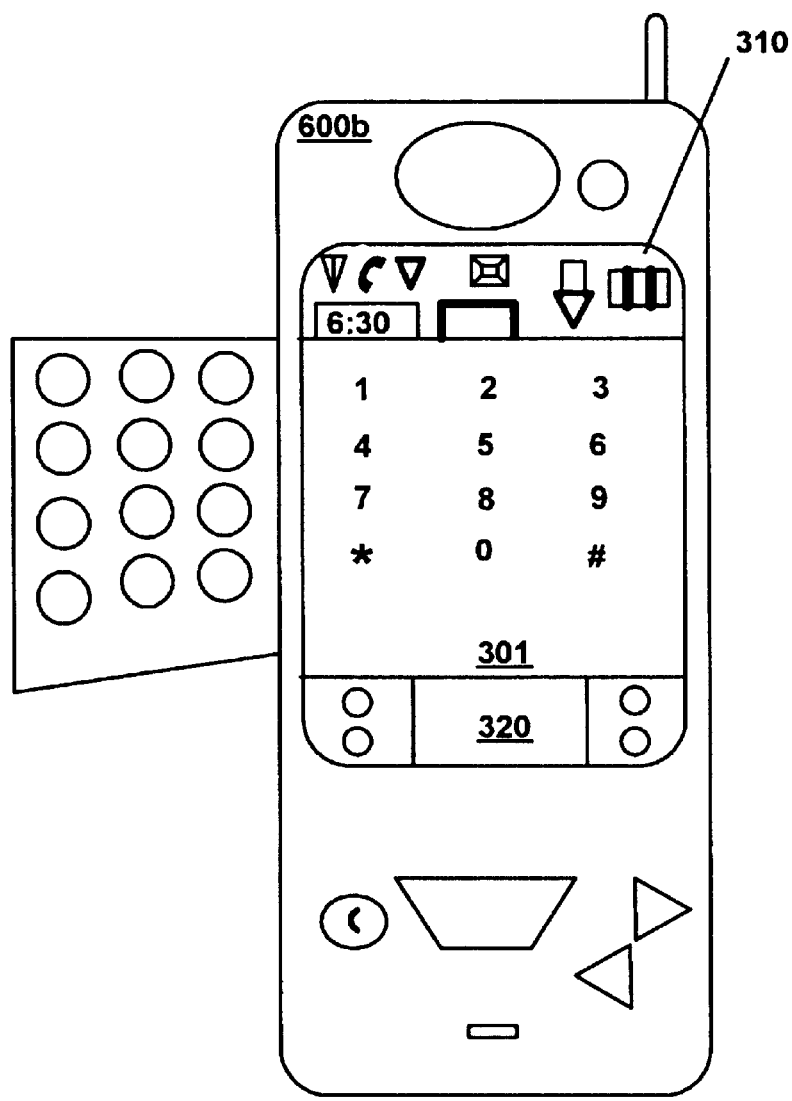
FIG. 7B illustrates a portable, wireless, telephone enabled as a PDA in accordance with an embodiment of the present invention.
Figure 7C:
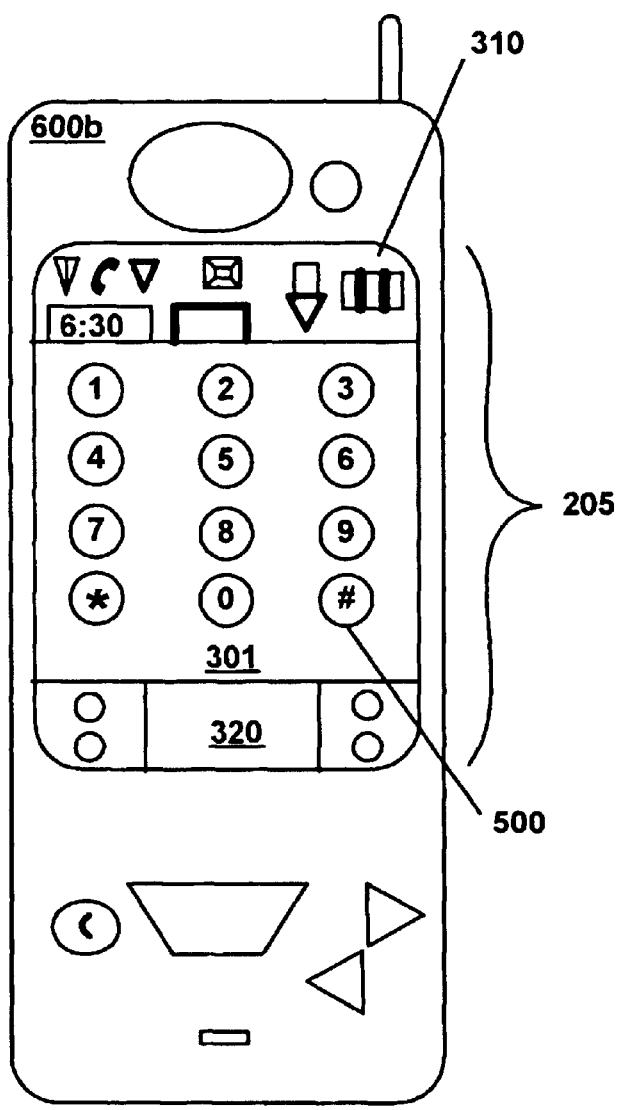
FIG. 7C illustrates a portable, wireless, telephone enabled as a PDA in accordance with an embodiment of the present invention.

In FIGS. 7A, 7B and 7C, the aforementioned limitation is removed by the implementation of the necessary keypad in an embodiment of the present invention. In FIG. 7A, PDA-enabled wireless phone 600b is involved in playing a game with phone status icons above the game area and transparent, flexible, overlay 500 out of the way to the side. When the user wishes to use the phone as in FIG. 7B, a dialing display 301 is presented in touch-screen display 205 that can be operated by stylus pressure or, as shown in FIG. 7C, by depressing tactile feedback buttons implemented in transparent, flexible, overlay 500. In FIGS. 7A and 7B, transparent, flexible, overlay 500 is shown as being hinged at the left side of touch-screen display 205. This implementation is shown only for the purpose of illustration. The overlay could be implemented with a hinge at any side or it could even be implemented in some fashion that does not require a hinge. The means used neither enables nor limits any embodiment of the present invention.

Figure 8:
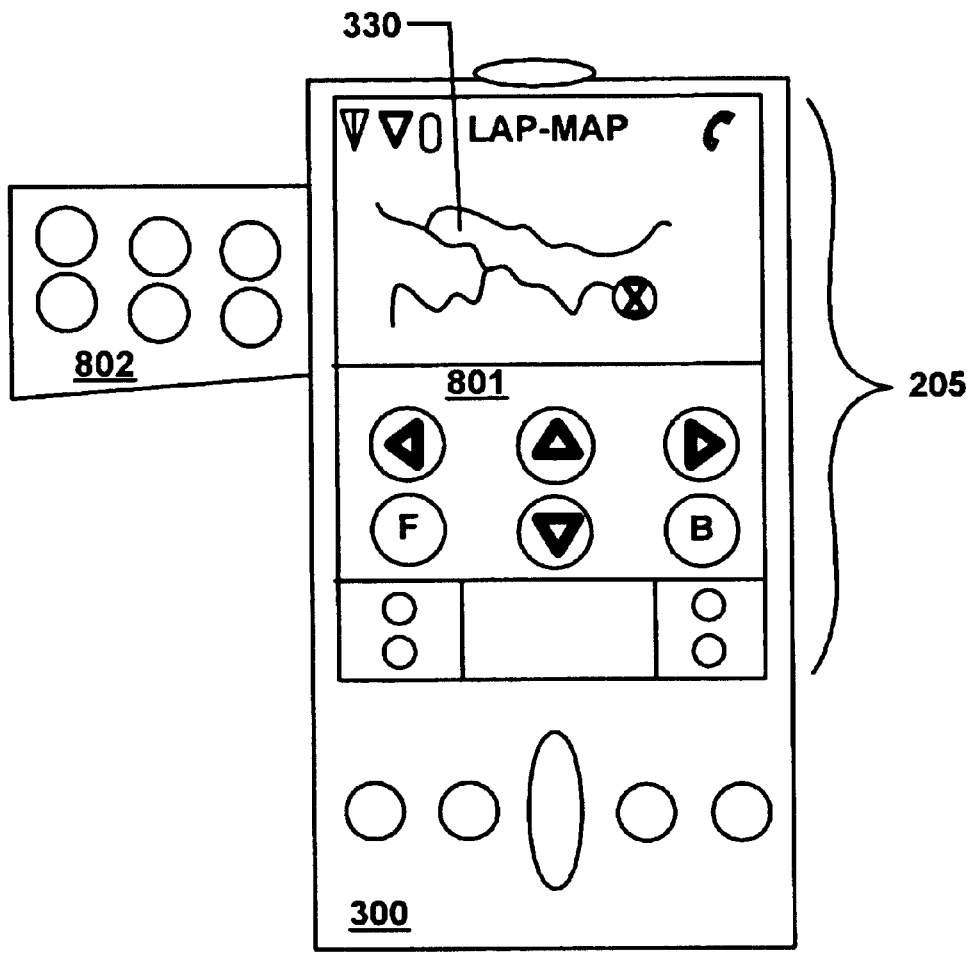
FIG. 8 illustrates a portable computing device with another enablement in accordance with an embodiment of the present invention.

FIG. 8 illustrates another embodiment of the present invention. Here, handheld computer 300 has a map navigation program in operation and is displayed in area 330. In this implementation, transparent, flexible, overlay 801 and 802 comprise a split overlay that allows one portion of the touch-screen display to be used for user input and another to display high resolution graphics. Overlaying the touch-screen display with both parts of the overlay would result in the normal phone-type keypad discussed above.

Figure 9A:
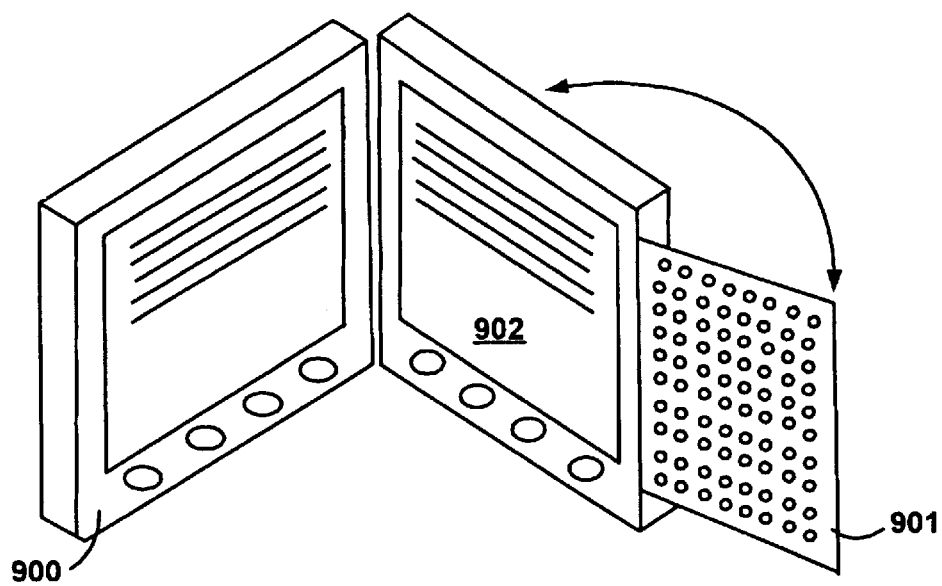
FIG. 9A illustrates an "E-book" enabled in accordance with an embodiment of the present invention.
Figure 9B:
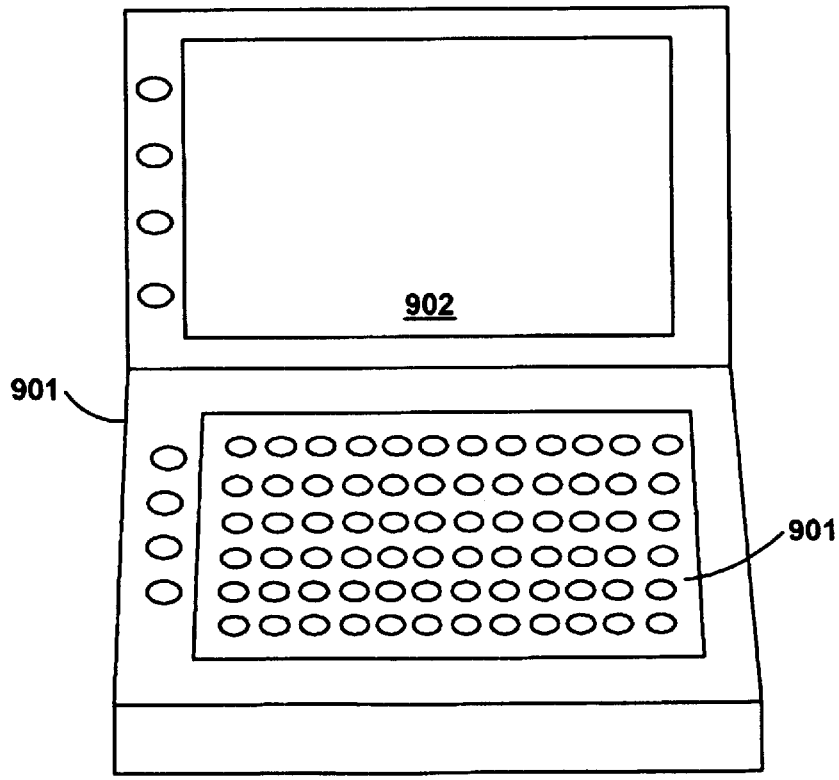
FIG. 9B illustrates an "E-book" enabled in accordance with an embodiment of the present invention.

FIGS. 9A and 9B illustrate yet another embodiment of the present invention. Here, a "qwertyuiop" (typewriter) keyboard is implemented in transparent, flexible, overlay 901 on an "E-book" 900. An E-book in this discussion is a portable electronic device adapted to the presentation of digital documents, most specifically, textual information such as a book. The device pictured in FIGS. 9A and 9B is book-sized and can be read very similarly to a book. With the addition of an appropriate operating system and a transparent, flexible, pushbutton overlay, the E-book can be employed as a robust PDA or even as a portable computer. FIG. 9A illustrates an E-book, 900, in a typical use; being read as a book. The textual presentation of a book is presented on display 902 and transparent overlay 901 is positioned out of the way. In FIG. 9B, transparent overlay 901 is laid on a portion of display 902 which, in this scenario, is enabled as a touch-screen on which an appropriate GUI is displayed. In this configuration, E-book 900 becomes enabled as a portable computer.

In each of the illustrations above, implementation of embodiments of the present invention pictures a hinged mounting of the transparent, flexible, pushbutton overlay. This is only for the purposes of illustration. Any sort of mounting of the device would entail the concepts presented in this embodiment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A portable electronic device, comprising:

an electronic circuit;

a housing enclosing said electronic circuit;

a touch-screen display, coupled to said electronic circuit and for displaying on-screen selections; and, a flexible membrane deployable for overlaying at least a portion of said on-screen selections of said touch-screen display, wherein said flexible membrane is operable to transfer pressure to said touch-screen display and wherein said flexible membrane is enabled to magnify information presented in said touch-screen display.

2. A portable electronic device as described in claim 1, wherein said portable electronic device is a cellular telephone.

3. A portable electronic device as described in claim 1, wherein said portable electronic device is a portable computing device.

4. A portable electronic device as described in claim 1, wherein said portable electronic device is a personal digital assistant.

5. A portable electronic device as described in claim 1, wherein said portable electronic device is of a type referred to as an E-Book.

6. A portable electronic device as described in claim 1, wherein said portable electronic device combines functions of a portable computing device and functions of a wireless telephone.

7. A portable electronic device as described in claim 1, wherein said flexible membrane is transparent.

8. A portable electronic device as described in claim 1, wherein said flexible membrane is enabled with tactile feedback buttons embodied as magnifying lenses.

9. In a portable electronic device, a method for entering information in a touch-screen display, comprising the steps of:
   rendering an image of a graphical user interface on said touch-screen display;
   overlaying said touch-screen display with a transparent flexible membrane capable of magnifying said image of said graphical user interface and of transmitting pressure to said touch-screen display at a point at which pressure is applied to said flexible membrane;
   magnifying appropriate information in said image of said graphical user interface; and
   registering input from said touch-screen display in response to pressure applied to said flexible membrane, said pressure being applied to points indicated in a graphic user interface displayed in said touch-screen display.

10. A method as described in claim 9, wherein said portable electronic device is enabled as a portable telephone device.

11. A method as described in claim 9, wherein said portable electronic device is a portable computing device.

12. A method as described in claim 9, wherein said portable electronic device is a personal data assistant.

13. A method as described in claim 9, wherein said portable electronic device is an E-Book.

14. A method as described in claim 9, wherein said portable electronic device combines functions of a portable computing device and functions of a wireless telephone.

15. A display device, comprising:
   a touch-screen for displaying on-screen selections; and,
   a transparent flexible overlay deployable to be occasionally laid over a portion of said touch screen and comprising buttons for aligning with portions of said on-screen selections, said flexible overlay, when contacted, for transferring pressure to a corresponding point of said touch-screen, wherein said buttons are enabled as magnifying lenses.

16. A display device as described in claim 15, wherein said buttons are tactile feedback buttons.

17. A display device as described in claim 15, further comprising a hinge aligned with an edge of said touch screen and connected to an edge of said flexible overlay.

18. A display device as described in claim 15, wherein said flexible overlay is removable.

19. A display device as described in claim 15, wherein said touch-screen is integrated within a PDA.

20. A display device as described in claim 15, wherein said touch-screen is integrated within an E-book device.

21. A display device as described in claim 15, wherein said touch-screen is for displaying graphical information and wherein said user selections are part of a graphical user interface displayed on said touch-screen.

* * * * *